United States Patent Office 3,444,148
Patented May 13, 1969

3,444,148
COPOLYMERS OF SELECTED POLYFLUOROPER-
HALOKETONE ADDUCTS WITH OTHER SE-
LECTED ETHYLENIC COMPOUNDS
Robert L. Adelman, Centerville, Del., assignor to E. I.
du Pont de Nemours and Company, Wilmington, Del.,
a corporation of Delaware
No Drawing. Filed Oct. 5, 1964, Ser. No. 401,696
Int. Cl. C08f 15/40, 15/32, 15/26
U.S. Cl. 260—80.72                       18 Claims

ABSTRACT OF THE DISCLOSURE

Claimed are solid film- and fiber-forming copolymers of at least one of certain terminally unsaturated polyfluorinated alcohols, at least one of certain substituted terminally unsaturated ethylenic compounds, and, optionally, a terminally unsaturated ethylenic hydrocarbon copolymerizable with the ethylenic compounds by means of a free-radical initiator. The polymers are formed by direct reaction of the precursors. Manufacturers, e.g., films and fibers, made from the polymers are also claimed.

FIELD OF THE INVENTION

This invention relates to, and has as its principal objects provision of, novel compositions of matter which are copolymers of certain unsaturated, polyfluorinated tertiary alcohols with certain ethylenic compounds, manufactures, e.g., films and fibers, made from the copolymers, and methods for the preparation of all of the same.

SUMMARY AND DETAILS OF THE INVENTION

In its composition-of-matter aspect, the invention comprises copolymers containing, on a molar basis: (1) from 0.2 to 20 mole percent of units derived from at least one compound designated as AB (since it is itself an adduct of two compounds A and B, as described later), this compound being a polyfluorinated tertiary alcohol of the formula

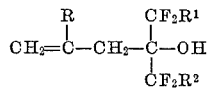

in which R is hydrogen, lower alkyl, lower alkoxycarbonyl, lower alkoxy, phenoxy, phenyl or cyano, and $R^1$ and $R^2$ are, separately, fluorine, chlorine, lower perfluoroalkyl or lower ω-chloroperfluoroalkyl, or together are the difluoromethylene, —$CF_2$—, radical; (2) from 50 to 99.8 mole percent of units derived from at least one ethylenic compound, designated as C, of the formula

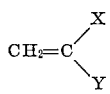

in which X is hydrogen, fluorine, chlorine, or lower alkyl and Y is lower alkoxycarbonyl, lower alkylcarbonyloxy, cyano, amido, fluorine or chlorine; and (3), optionally, from 0 to 49 mole percent of units derived from a terminally unsaturated ethylenic hydrocarbon copolymerizable with C in the presence of free radical initiators, this optional component being designated as D.

In its process aspect, the invention comprises preparing the copolymers by any of the known methods for ethylenic polymerization, e.g., in bulk, solution and emulsion systems. A general skeletal equation for the reaction involved, omitting the component D, can be written as (I)   AB+C→AB—C—AB—C—C—C—AB—C—C—

It will be noted that, while —C— and —AB— units can be randomly distributed in the polymer, depending to some extent on the mole ratios of the reactants, the —AB— unit itself is constant, i.e., the ratio of —A— to —B— remains 1:1 and —A— and —B— remain attached to each other. Since the reactions here are straightforward addition polymerization reactions, it will be understood that the symbols AB and C represent either the reactants or the units derived from these reactants in the resultant polymer.

The compounds AB employed as reactants in the above process are themselves 1:1 adducts of polyfluoroperhaloketones (A) and ethylenic compounds (B) with a methyl group on the alpha unsaturated carbon. They are terminally unsaturated, tertiary fluoroalcohols obtained by direct interaction of the ketone and ethylenic compound in the absence of any polymerization initiator. Some of these compounds are shown, for example, by Knunyants et al., Bull. Acad. Sci., U.S.S.R., Div. Chem. Sci., 355 (1962), who report the reaction of hexafluoroacetone with propylene and isobutylene; Belgian Patent 625,425, which discloses the reaction of many terminally unsaturated ethylenic compounds such as α-methyl styrene with perhaloketones such as hexafluoroacetone or sym.-dichlorotetrafluoroacetone; and U.S. Patent 3,140,298, which shows the reaction of perfluorocyclobutanone with a number of unsaturates.

The addition reaction between the polyfluoroperhaloketone and the unsaturated compound may be accomplished simply by mixing the reactants, preferably using a molar excess of the unsaturated compound, and maintaining them at the appropriate reaction temperature, e.g., 0–200° C., under autogenous pressure for an appropriate time, e.g., 30 minutes to several hours. Specific conditions will vary with the activity of the reactants as will be evident to those skilled in the chemical art.

For example, in the immediate invention, hexafluoroacetone (A) and isobutylene (B) represent preferred precursor species, so the reaction (II)                A+B→AB can be specifically illustrated with reference to these precursors:

(III) 
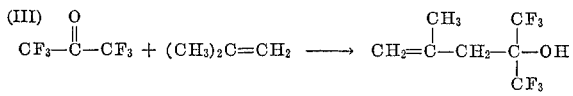

Polyfluoroperhaloketones usable as the precursor A in forming the component AB of the copolymers of this invention include perfluoropropanone (hexafluoroacetone), perfluoro-2-butanone, perfluoro-2-pentanone, perfluoro-3-pentanone, perfluoro-2-hexanone, perfluoro-3-hexanone, perfluoro-4-heptanone, perfluoro-2-octanone, perfluoro-5-nonanone, perfluoro(2,6 - dimethyl - 4 - heptanone), perfluoro - 7-tridecanone, 1,3-dichlorotetrafluoropropanone, 1,5 - dichlorooctafluoro-3-pentanone, 1-chloropentafluoropropanone, 1 - chloro - 4 - (trifluoromethyl)octafluoro-3-pentanone, and perfluorocyclobutanone. These polyfluoroketones are known compounds preparable by general methods (see, for example, Lovelace et al., "Aliphatic Fluorine Compounds" (1958), and U.S. Patents 2,853,-524; 3,039,995 and 3,091,643).

Specific examples of ethylenically unsaturated compounds suitable as the precursor B in Equation II include propylene, isobutylene, 2 - methyl - 1 - butene, 2,4,4-trimethyl - 1 - pentene, 2-methyl-1-octene, α-methylstyrene, methyl methacrylate, ethyl methacrylate, butyl methacrylate, n-hexyl methacrylate, methacrylonitrile, α-methylvinyl ethyl ether, α-methylvinyl n-hexyl ether and α-methylvinyl phenyl ether.

Thus, specific fluoroalcohols AB usable in preparing the copolymers of the invention include, among others: the alcohols of the examples below, viz., 1,1,1-trifluoro-2 - (trifluoromethyl) - 4 - methyl-4-penten-2-ol (Examples

1-8), 1,1,1 - trifluoro - 2-(trifluoromethyl)-4-methoxycarbonyl-4-penten-2-ol (Example 9), 1,1,1-trifluoro-2-(trifluoromethyl) - 4 - penten - 2-ol (Example 11), 1-allyl-2,2,3,3,4,4-hexafluorocyclobutanol (Example 12), 1,1,1-trifluoro - 2 - (trifluoromethyl)-4-neopentyl-4-penten-2-ol (Examples 13 and 14), 1,1,1 - trifluoro - 2 - (trifluoromethyl)-4-phenyl-4-penten-2-ol (Example 15), and 1,1,1-trifluoro - 2 - (trifluoromethyl)-4-methoxy-4-penten-2-ol (Example 16 and 17); 4 - cyano - 1,1,1-trifluoro-2-(trifluoromethyl - 4 - penten - 2-ol; 1-chloro-1,1-difluoro-4-methyl - 2 - (trifluoromethyl)-4-penten-2-ol; 1-chloro-2-(chlorodifluoromethyl) - 1,1-difluoro-4-methyl-4-penten-2-ol; 1 - chloro-1,1-difluoro-2-(trifluoromethyl)-4-penten-2 - ol; 1 - chloro-2(chlorodifluoromethyl)1,1-difluoro-4-phenyl - 4 - penten-2-ol; 1-chloro-1,1-difluoro-4-methoxycarbonyl - 2 - (trifluoromethyl) - 4-penten-2-ol; 5-cyano-1,1,1,2,2 - pentafluoro - 3-(trifluoromethyl)-5-hexen-3-ol; 1,1,1,2,2,3,3 - heptafluoro - 4 - (perfluoropropyl) - 6 - (n-hexyl) - 6 - hepten-4-ol; 1,1,1,2,2,3,3,4,4,5,5,6,6-tridecafluoro- 7 -(trifluoromethyl)-9-ethoxycarbonyl-9-undecen-7 - ol; 1 - chloro-1,1,2,2-tetrafluoro-3-(2-chloroperfluoroethyl) - 5-(n-hexyloxycarbonyl)-5-hexen-3-ol; 2,2,3,3,4,4-hexafluoro-1-(2-phenyl-2-propenyl)cyclobutanol; 2,2,3,3,4,4 - hexafluoro-1-(2-methoxycarbonyl-2-propenyl)cyclobutanol; 1 - chloro-2-(chlorodifluoromethyl)-1,1-difluoro-4-(n-hexyloxy)-4-penten-2-ol; and 1,1,1,2,2-pentafluoro-3-(pentafluoroethyl)-5-phenoxy-5-hexen-3-ol. In addition, the cyclized methyl methacrylate-hexafluoroacetone adduct,

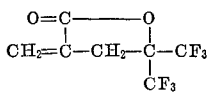

can be employed (see Example 10). In this case, it will be seen that the radical R in the general formula given above for component AB is alkoxycarbonyl by virtue of lactone formation between the ester group and the hydroxyl group of the adduct.

Two or more such fluoroalcohols (AB component) can be used together in the copolymerization system.

Several illustrative preparations of polyfluoroperhaloketone adducts suitable for use as the AB component in this invention will be described later on for purposes of information.

Component C of the copolymers of this invention has, in the monomeric form, the general formula

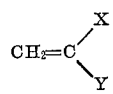

where X and Y have the previously stated significance. Specific examples of suitable comonomers of the above general formula include, besides methyl methacrylate and acrylonitrile whose use is illustrated in the examples below, methyl acrylate, acrylyl amide, methacrylonitrile, methyl α-chloroacrylate, isopropenyl acetate, vinyl acetate, butyl methacrylate, n-hexyl acrylate, vinyl fluoride, vinylidene fluoride, vinyl chloride, vinylidene chloride, ethyl α-fluoroacrylate, 2-fluoropropene, etc. Two or more such unsaturates can be used together in the copolymerization system, if desired.

Since, among the comonomers designated as C, the great majority of the technically most important ones differ from precursor B of component AB, for one thing because they do not have a methyl group on the alpha unsaturated carbon, it follows that the most valuable and preferred copolymers of this invention are those in which this difference is present. Such preferred copolymers are obtained whenever the radical Y, in the formula

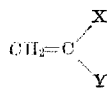

of component C, is different from the radical R in the formula

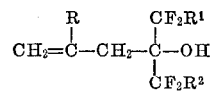

of component AB.

Optionally, a third component (that previously designated as D) may be present in the copolymers of this invention, thus forming a terpolymer of the type

—AB—C—D— etc., as illustrated in Example 5 below, or higher multicomponent polymers if more than one of AB, C or D is used. Component D is a terminally unsaturated ethylenic monomer which, alone, would not copolymerize readily or at all with the adduct AB, but does so copolymerize in the presence of another comonomer with which it is copolymerizable in the presence of free-radical initiators, this comonomer (component C) containing, in contradistinction to D, highly activating groups which make it copolymerizable with either AB or D. Most suitably, component D, if any is used, is a terminally unsaturated ethylenic hydrocarbon, preferably of 2 to 10 carbon atoms, examples of which are ethylene, propylene, isobutylene, 1,3-butadiene, isoprene, diisobutylene, 1-decene, styrene, α-methylstyrene and vinyltoluene. In the copolymers of this invention, D may thus replace a portion of component C, when it is desired to modify the properties of the copolymer by introduction of intrachain hydrocarbon units. In general, however, there is no outstanding advantage gained by introducing a D component, and the preferred copolymers of this invention consist solely of the essential AB and C components.

The proportions of comonomers (AB, C and, optionally, D) in the polymerization system are so chosen that the final copolymer will contain, on a molar basis, from 0.2 to 20% of units of AB, the remainder being from 80 to 99.8% of units of C, if the latter is used alone, but in any event at least 50% of units of C if a third component D is used, in which case the copolymer may contain up to 49% of units of D, the total of AB, C and D, of course, adding up to 100% on a molar basis. With these relatively low molar amounts of the AB component, the copolymers generally retain the desirable physical properties, such as film- or fiber-forming ability, toughness, strength, etc., of the C homopolymers, but are favorably modified owing to the presence of the recurring, pendant

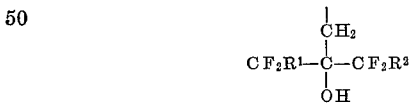

groups contributed by the AB component. Significant changes are observed in copolymers containing as little as 0.2 mole percent of the fluoroalcohol AB. Illustrations of these favorable effects will be given later.

As noted above, in its process aspect, the invention comprises polymerizing the preformed polyfluoroperhaloketone adduct (AB) with the selected ethylenic compound (C) or compounds (D). The polymerization can readily be carried out in any of the systems commonly used for ethylenic polymerization, for example, bulk, solution, and emulsion systems. Any of a large number of free-radical initiators are effective in promoting these polymerizations. Specific examples of initiators are the potassium persulfate/sodium bisulfite redox catalysts, benzoyl peroxide, tert.-butyl perpivalate, triethylborane and oxygen, azobis(isobutyronitrile), and di-tert.-butyl peroxide. Initiator concentrations from 0.01 to 2.0% are satisfactory. For enhanced polymerization rates, higher initiator concentrations can be used.

Temperature and pressure are not critical variables in the process of this invention. Temperatures of from —30 to 150° C. can be employed depending upon the activity of the reactants and initiator used. Pressures can vary from autogenous to 3000 atmospheres or above. The process can, of course, be batch or continuous.

The relative proportions of monomers to be copolymerized are so chosen as to arrive at a copolymer in which the molar ratio of polymerized components is within the previously stated range. Thus, monomer C is always used in molar excess relative to the polyfluoroalcohol (monomer AB). Generally speaking, there is used between 3 and 60 moles of monomer C per mole of monomer AB. If a third component D is desired, the amount of monomer D in the polymerization mixture will generally be between 1 and 20 moles per mole of monomer AB, the sum of C and D being in the range of 3–60 moles per mole of monomer AB. Specific relative amounts depend, of course, on the relative rates of polymerization of the respective monomers under the operating conditions. In this connection, the polyfluoroalcohol AB generally polymerizes slower than the other comonomers, so that the molar ratios of C or D relative to AB will generally be higher in the final copolymer than they were in the initial monomer mixture.

When the polymerization is conducted in solution, it is sometimes desirable to facilitate contact between the reactants, any suitable solvent can be used. These include, for example, aromatic hydrocarbons such as benzene, toluene or the xylenes; halohydrocarbons such as dichlorotetrafluoroethane, 1,1,2-trichloro-1,2,2-trifluoroethane, methylene dichloride or chlorobenzene; or other inert solvents such as acetonitrile, dioxane, tetrahydrofuran, and the like.

In the examples which follow, the fluoroketone adduct, or fluoroalcohol (AB) was prepared in a separate step and carefully purified prior to reaction with the ethylenic component. If it is desired, the fluoroalcohol can be prepared immediately before use and passed into contact with the ethylenic reactant without separation or purification.

High molecular weight copolymers are surprisingly obtained in copolymerization of the present fluoroketone adducts despite high concentration of allylic hydrogen. If low molecular weight copolymers are desired, however, chain transfer agents, such as lauryl mercaptan, or chain transfer solvents, such as toluene, may be used.

The process is a vinyl addition polymerization yielding an essentially linear polymer. It can be represented in somewhat more detail than in Equation I as:

(IV)

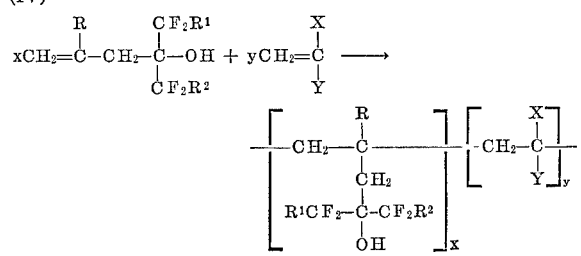

wherein R, R$^1$, R$^2$, X and Y have the meanings given above, $x$ is 0.2 to 20 and $y$ is 80–99.8 if only the two components (AB and C) shown above are present. If a third component, D, is present, the copolymer contains a third intrachain unit corresponding to D and replacing part of C, the amount, $z$ of this third unit being up to 49. The sum of $x$, $y$ and $z$ is 100, these three subscripts fundamentally representing mole percentages.

It will be seen that, in the copolymers of this invention, the fluoroalcohol groups

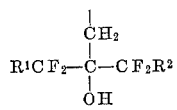

derived from the adduct AB are always and exclusively present as side chain, or pendant, groups.

Thus, from the structural standpoint, these copolymers are very significantly different from the polymers obtainable by reacting polyfluoroperhaloketones, such as the A precursors here, with ethylenically unsaturated compounds such as the B precursors here, in the presence of free-radical generators. Under such polymerizing conditions, there is no evidence of formation of an AB adduct, but a polymer is formed instead. In these polymers, the polyfluoroketone compound is chiefly or even exclusively present as fluoroether groups,

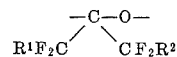

located within the main polymer chain, or backbone. Pendant polyfluoroisopropanol groups may occasionally be present due to hydrogen abstraction or chain transfer reactions, but in no case does the amount of such groups correspond to the whole of the polyfluoroketone used. In contrast, the copolymers of the present invention contain no intrachain oxygen (ether groups) but have a regular, uniform structure in which the backbone consists solely of carbon atoms, all of the fluoroalcohol groups being in side chains. This structure may possibly be responsible for the fact, that among other valuable properties, these copolymers have very high molecular weights, as shown by inherent viscosities nearly always higher than 1.0, and in most cases exceeding 1.5.

An advantage of the process of this invention is that, by virtue of the fact that the polyfluoroketone is first reacted with a suitable unsaturate to form an adduct, i.e., an unsaturated polyfluoroalcohol of definite structure, which then becomes one of the comonomers, the polymerization is readily controllable for the purpose of forming copolymers containing the monomer units in the desired range of relative proportions.

The presence of the fluorinated alcohol components in the copolymers actually imparts enhanced properties not found in homopolymers or copolymers of the ethylenic compounds reacted therewith. For example, a methyl methacrylate copolymer containing as little as 1.1 percent by weight of 1,1,1-trifluoro-4-methyl-2-(trifluoromethyl)-4-penten-2-ol (see Example 7) has a heat distortion temperature almost 20° C. above that of a commercial poly-(methyl methacrylate). This improvement in heat distortion temperature is obtained without significant sacrifice in strength or modulus or ability to withstand exposure outdoors. Such high heat-distortion temperatures are desirable for a number of uses including automobile tail light assemblies and arc-light housings.

In the case of acrylonitrile copolymers, the presence of the alcohol group also leads to enhanced compatibility with other polymers. For example, copolymers of acrylonitrile and 1,1,1-trifluoro-4-methyl-2-(trifluoromethyl)-4-penten-2-ol can be blended with ethylene/vinyl acetate copolymers and with polyamides. The blends have better impact strength and adhesion than do similar blends made from polyacrylonitrile homopolymers, and they are useful in the adhesive and protective coating industries.

A further highly useful property of the copolymers of this invention is the dyeability conferred by the presence of fluoroalcohol groups. This is a very important advantage, especially with copolymers of hydrophobic vinyl monomers.

There are described below several illustrative preparations (examples (a)–(h)) of polyfluoroketone/unsaturate adducts, i.e., unsaturated polyfluoroalcohols, suitable for use as monomer components to form the copolymers of this invention. All of these preparations were conducted at autogeneous pressure.

(a) Fifty grams of hexafluoroacetone and 67 g. of isobutylene were reacted in a 250 cc. stainless steel shaker tube at 50° C. for 3 hours to give 24 g. of 1,1,1-trifluoro-2-(trifluoromethyl)-4-methyl-4-penten-2-ol,

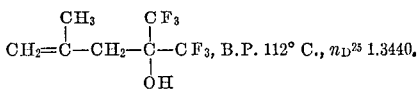

Analysis.—Calc'd. for $C_{11}H_{16}F_6O$: C, 47.50; H, 5.76; F, 41.00. Found: C, 47.03; H, 6.21; F, 41.43.

Product prepared according to this example was used in Examples 1–8, below.

(b) Fifty grams of hexafluoroacetone and 112 g. of diisobutylene (2,4,4-trimethyl-1-pentene) were reacted in a 250 cc. steel tube at 40° C. for 2 hours and at 70° C. for 10 minutes. There was obtained 85 g. of 1,1,1-trifluoro-2-(trifluoromethyl)-4-neopentyl-4-penten-2-ol,

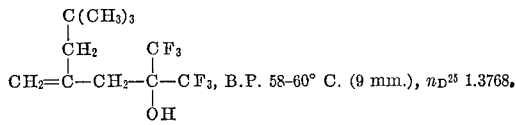

Product prepared according to this example was used in Examples 13 and 14, below.

(c) Twenty-eight grams of sym.-dichlorotetrafluoroacetone and 11 g. of diisobutylene were reacted in a glass reactor at 66–71° C. for 5 hours to give 18 g. of 1-chloro-1,1 - difluoro - 2 - (chlorodifluoromethyl)-4-neopentyl-4-penten-2-ol, B.P. 116° C. (28 mm.), $n_D^{25}$ 1.4261.

Analysis.—Calc'd for $C_{11}H_{16}F_6O$: Cl, 22.9; F, 24.50. Found: Cl, 23.04; F, 24.20.

(d) One hundred grams of hexafluoroacetone and 200 g. of methyl methacrylate were reacted in a 1-liter steel tube at 150° C. for 6 hours and at 25–150° C. for 5 hours. There was obtained 51 g. of 1,1,1-trifluoro-2-(trifluoromethyl)-4-methoxycarbonyl-4-penten-2-ol,

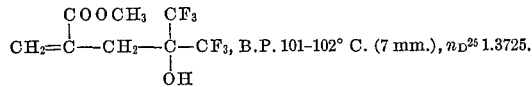

Analysis.—Calc'd for $C_8H_8F_6O_3$: C, 36.12; H, 3.03; F, 42.84. Found: C, 36.47; H, 3.40; F, 43.39.

Product prepared according to this example was used in Example 9, below.

(e) One hundred grams of hexafluoroacetone and 200 g. of methyl methacrylate in a 500 cc. "Hastelloy" shaker tube were reacted in the presence of 1 g. of $AlCl_3$ at 100° C. for 3 hours to give 21 g. of product, B.P. 84–96° C. (54 mm.). The product was a cyclic compound, formed by the loss of $CH_3OH$ from the alcohol of example (d), i.e., the lactone of 5,5,5-trifluoro-4-(trifluoromethyl)-4-hydroxy-2-methylenepentanoic acid,

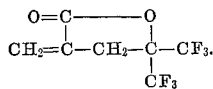

Analysis.—Calc'd for $C_7H_4F_6O_2$: C, 35.92; H, 1.72; F, 48.72. Found: C, 36.40; H, 2.07; F, 48.40.

The product of this example and that of example (d) are usually obtained simultaneously.

Product prepared according to this example was used in Example 10, below.

(f) One hundred and sixty-six grams of hexafluoroacetone and 134 g. of methacrylonitrile were reacted in a 500 cc. shaker tube at 150° C. for 1 hour. Eleven grams of 1,1,1 - trifluoro - 2 - (trifluoromethyl) - 4 - cyano - 4-penten-2-ol were obtained, B.P. 54–56° C. (58 mm.).

(g) One hundred and sixty-six grams of hexafluoroacetone and 226 g. of α-methylstyrene were reacted in a 500 cc. "Hastelloy" shaker tube at 150° C. for 4 hours to give 230 g. of 1,1,1-trifluoro-2-(trifluoromethyl)-4-phenyl-4-penten-2-ol,

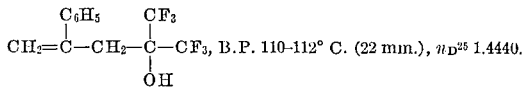

Product prepared according to this example was used in Example 15, below.

(h) α-Methylvinyl methyl ether (28 g., 0.39 mole) was placed in a 500 cc. stainless steel shaker tube and cooled to −70° C. under a nitrogen atmosphere, then hexafluoroacetone (56 g., 0.34 mole) was added. The tube was sealed, shaking was started, and the temperature was allowed to rise to +3° C. for 40 minutes, then to +32° C. for 200 minutes. No pressure developed in the tube, indicating complete reaction. There was obtained 68 g. of 1,1,1 - trifluoro - 2 - (trifluoromethyl) - 4 - methoxy - 4-penten-2-ol,

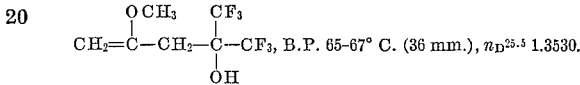

Analysis.—Calc'd for $C_7H_8F_6O_4$: C, 35.3; H, 3.36; F, 47.9. Found: C, 35.79; H, 3.54; F, 47.22.

Product prepared according to this example was used in Examples 16 and 17, below.

EMBODIMENTS OF THE INVENTION

There follow some nonlimiting examples illustrative of the various aspects of the invention. These examples were conducted either in an open vessel at atmospheric pressure (Examples 1–4, 6–15) or in a closed vessel at autogenous pressure (Example 5).

EXAMPLE 1

Copolymerization of 1,1,1-trifluoro-2-(trifluoromethyl)-4-methyl-4-penten-2-ol and acrylonitrile Sixty ml. of water were boiled in a 250 cc., 3-neck flask under a stream of nitrogen. After cooling, 1 g. of the sodium salt of technical lauryl alcohol sulfate was added and dissolved by stirring with a magnetic stirrer. Thirty g. of acrylonitrile that had been passed through silica and 10 g. of 1,1,1-trifluoro-2-(trifluoromethyl)-4-methyl-4-penten-2-ol (see example (a)) were placed in the flask, then 0.4 g. of potassium persulfate and 0.2 g. of sodium bisulfite were added.

The temperature of the mixture was then maintained at 25–27° C. for 16 hours under nitrogen during which time a heavy, cheesy polymer was formed. Water was added and the mixture filtered. A solution of 15 g. of sodium acetate in 50 cc. of water was added to clarify the filtrate and the filtrate heated to 70° C. to coagulate the polymer completely. Additional polymer thus obtained was collected on the same filter used in the original filtration. The product was extensively washed with water and air-dried. It was then dissolved in warm dimethylformamide, reprecipitated with water in a high-speed blender, filtered, boiled in water for ½ hr., refiltered, and dried in a vacuum oven at 110° C. for 6 hrs. Twenty-seven grams of white, fluffy polymer were obtained.

The inherent viscosity of the product in dimethylformamide at 0.25% concentration and at 25° C. was 2.96. Fluorine analysis of the polymer gave values of 9.72% and 10.11%, which correspond to 19.3% by weight of the alcohol moiety (5.4 mole percent) in the copolymer. Pressing a 0.2 g. sample at 150° C. for 2 min. at 18,000 p.s.i. gauge pressure gave a partially molded, very light amber, hard, stiff film which showed strong absorption in the infrared at 2.9 to 3.0μ (characteristic of hydroxyl groups), and new absorption peaks of moderate intensity at 8.25, 8.70μ, from 9.5–10.5μ, and 13.8 and 14.4μ (characteristic of the carbon-fluorine bond). Strong dyeable fibers could be obtained by dry spinning the polymer from dimethylformamide solution.

EXAMPLE 2

Copolymerization of 1,1,1-trifluoro-2-(trifluoromethyl)-4-methyl-4-penten-2-ol and acrylonitrile in an organic solvent A solution of 40 ml. of benzene, 0.2 g. of benzoyl peroxide, 10 g. of 1,1,1-trifluoro-2-(trifluoromethyl)-4-methyl-4-penten-2-ol, and 35 g. of acrylonitrile was agitated with a magnetic stirrer as it was heated under nitrogen at 70–76° C. for 3 hours. A heavy slurry formed that was thinned by addition of 50 ml. of benzene. Heating was continued for another 4½ hrs. The reaction mixture was cooled, and the polymer in it was separated on a filter and dried in air.

The filtered polymer was dissolved in dimethylformamide, the polymer solution was washed with petroleum ether, and the polymer was precipitated from dimethylformamide with water by means of a high speed blender. After the polymer had been boiled in water for 15 minutes, it was dried in a vacuum oven at 110° C. for 10 hours. The product was amber in color and weighed 15 g. Fluorine analysis values were 6.26 and 6.30%, which corresponds to the presence of 13% by weight of the alcohol moiety (3.4 mole percent). Inherent viscosity of a 0.25% solution of the polymer in dimethylformamide at 25° C. was 1.20. Pressing at 180° C. between aluminum foil gave clear, homogeneous self-supporting, amber-colored films of the polymer that absorbed in the infrared in the regions indicated in Example 1.

EXAMPLE 3

A polymerization was run as in Example 1 except that a higher acrylonitrile/alcohol ratio was used (35 g. of acrylonitrile and 3 g. of 1,1,1-trifluoro-2-(trifluoromethyl)-4-methyl). The polymerization proceeded much more rapidly than in Example 1. A heavy, white dispersion resulted after 5 hours, and the reaction was allowed to continue for another 16 hours. After coagulation and purification as in Example 1, 19 g. of slightly yellow, shredded product was obtained. Fluorine analysis gave values of 3.91 and 3.92%, corresponding to 8% alcohol content by weight (2 mole percent). The infrared showed appreciable absorption at 3.0, 13.9, and 14.4μ. The inherent viscosity of the product was very high, being above 5 in 0.25% dimethylformamide solution at 25° C.

EXAMPLE 4

A polymerization was run as in Example 1 except that 0.25 g. of technical dodecyl mercaptan was added as a chain transfer agent to control the molecular weight and, hence, the solution viscosity of the polymer. The pot temperature was held at 39–40° C. for 7 hours. The thick emulsion that resulted was poured into a 1:1 ethanol/water mixture, warmed to 50° C., and 5 g. of sodium sulfate added. A voluminous coagulum resulted, which was worked up as in Example 1. Twenty-five grams of white, fluffy, solid product was obtained. Fluorine analysis gave values of 4.43 and 4.54%, which corresponds to 9% by weight of alcohol (2.3 mole percent). The inherent viscosity of a 0.25% solution in dimethylformamide at 25° C. was 1.90. A film pressed at 180° C. showed pronounced absorption at 3.0, 13.9, and 14.3μ.

Other preparations using the comonomer system of Examples 1–4 gave copolymers in which the proportion of polymerized fluoroalcohol ranged down to 1.5% by weight, or approximately 0.36% on a mole basis.

EXAMPLE 5

Terpolymerization of 1,1,1-trifluoro-2-(trifluoromethyl)-4-methyl-4-penten-2-ol, acrylonitrile and isobutylene Thirty grams of acrylonitrile (passed through silica), 60 g. of water (boiled under nitrogen), 1 g. of the sodium salt of technical lauryl alcohol sulfate (dissolved in the water), and 10 g. of 1,1,1-trifluoro-2-(trifluoromethyl)-4-methyl-4-penten-2-ol were added to a 250 ml. stainless steel shaker tube. The tube was cooled to −70° C. under nitrogen, and 0.4 g. of potassium persulfate was added, followed by 0.2 g. of sodium bisulfite. The tube was evacuated, flushed with nitrogen, re-evacuated and 16 g. of isobutylene were added thereto. The tube was sealed, shaking was started, and the temperature was brought up to 40° C. and held there for 20 hours. A low-viscosity milky emulsion resulted that contained a small amount of an oil of higher density. The oil layer was separated and the polymer isolated from the aqueous emulsion by addition of 200 cc. of 1:1 ethanol/water mixture and 5 g. of sodium carbonate. The coagulated polymer was worked up as in Example 1.

Twenty-nine grams of off-white, shredded product were obtained. On pressing at 180° C., clear, almost colorless films resulted which were quite tough and exhibited good flow and good impact strength. Infrared analysis of the films showed strong absorption at 3.0, 13.8, and 14.3μ with little change in intensity of these bands on further pressing at 220° C. Fluorine analyses gave 3.90 and 3.89%, indicating 8% by weight of fluoroalcohol. Nitrogen analyses were 19.36 and 19.39%, indicating 73% by weight of acrylonitrile. Thus, the terpolymer composition was 73/19/8 acrylonitrile/isobutylene/alcohol (78.7/19.3/2 mole percent). The inherent viscosity of the terpolymer was 2.73 (0.25% solutions in dimethylformamide at 25° C.). Tough, almost colorless, readily dyeable fibers could be obtained by dry-spinning the terpolymer from dimethylformamide solution.

Other polymerization experiments using the termonomer system of Example 5 gave copolymers in which the amount of alcohol varied from 5 to 19% by weight and that of isobutylene from 6 to 19% by weight.

EXAMPLE 6

Copolymerization of 1,1,1-trifluoro-2-(trifluoromethyl)-4-methyl-4-penten-2-ol and methyl methacrylate Thirty grams of methyl methacrylate (freshly distilled) were mixed with 10 g. of 1,1,1-trifluoro-2-(trifluoromethyl)-4-methyl-4-penten-2-ol and 0.1 g. of benzoyl peroxide in a flask containing a magnetic stirrer and blanketed with nitrogen. The solution was heated at 80–82° C. for 45 minutes. The internal temperature rose from 77° C. to 82.5° C. and the viscosity steadily increased until the stirrer was stopped. The polymer was precipitated from the viscous solution by addition to petroleum ether in a high-speed blender. The washed polymer was taken up in acetone and reprecipitated in petroleum ether. The polymer was dried in a vacuum oven at 110° C. for 16 hours.

A white powdered product, 8.1 g., was obtained. Pressings at 150 to 220° C. gave clear, colorless, tough films. The infrared spectra of these films showed an enhanced absorption band at 2.9μ and new absorption peaks at 14.3 and 13.6μ. The polymer contained 1% fluorine, which corresponds to 2% by weight of alcohol (0.91 mole percent). The inherent viscosity of 0.25% solutions in acetone at 25° C. was 0.55.

EXAMPLE 7

Copolymerization of 1,1,1-trifluoro-2-(trifluoromethyl)-4-methyl-4-penten-2-ol and methyl methacrylate in aqueous dispersion To 60 cc. of water boiled under nitrogen was added 1 g. of the sodium salt of technical lauryl alcohol sulfate. Ten grams of the alcohol of example (a) and 30 g. of freshly distilled methyl methacrylate were added, followed by 0.4 g. of potassium persulfate and 0.2 g. of sodium bisulfate. The mixture was held at 27–31° C. for 20 hours. A stable, white dispersion resulted. The product was coagulated by the addition of 1:1 mixture of ethanol/ water, redissolved in acetone, and reprecipitated with petroleum ether.

The reprecipitated polymer was dried in a vacuum oven at 110° C. for 16 hours to give 29 g. of white, fluffy, colorless product. Fluorine analyses were 0.52 and 0.61% which indicated the presence of 1.1% by weight of alcohol (0.50 mole percent). The inherent viscosity of the polymer in acetone (0.25% solutions at 25° C.) was 2.46. The infrared spectrum showed the expected enhancement at 14.3μ and at 2.9μ. A pressed film showed the remarkably elevated softening point of 122° C., compared to 102–105° C. for conventional 100% poly(methyl methacrylate).

This polymer has a much higher heat-distortion temperature than methyl methacrylate homopolymer. Heat-distortion temperature of the polymer as determined by the ASTM test D648–56 using a stress of 264 lb./sq. in. was 122° C. as compared to a value of 104° C. for ordinary 100% poly(methyl methacrylate). Blush resistance was determined after boiling the polymer in water for 2 hours and found to be better than that of commercial poly(methyl methacrylate). Films prepared by pressing the polymer at 220° C. for 4 minutes at pressures of 2000–10,000 lb./sq. in. showed mechanical and weathering properties as good as those of 100% poly(methyl methacrylate). This conclusion is supported by the data in the following table:

TABLE

| | Polymer of this example | Poly(methyl methacrylate)[1] |
|---|---|---|
| Heat distortion temperature (° C.) | 122 | 90 |
| Tensile strength at break[2] (lb./sq. in.) | 11,700±100 | 7,600±2,000 |
| Elongation at break (percent) | 2.2±0.1 | 2.8±0.2 |
| Initial tensile modulus (lb./sq. in.) | 854,000±3,400 | 743,000±39,000 |
| Work to break | 0.61±0.07 | 0.68±0.44 |
| After 500 hours' exposure in an accelerated weathering test machine | | |
| Tensile strength at break (lb./sq. in.) | 4,100±2,600 | 6,400±1,500 |
| Elongation at break (percent) | 2.2±1.6 | 1.6±0.4 |
| Initial tensile modulus (lb./sq. in.) | 419,000±39,000 | 427,000±20,500 |
| Work to break | 0.28±0.23 | 0.21±0.09 |

[1] This polymer was prepared by granular polymerization in water, using benzoyl peroxide as the initiator.
[2] Film properties were determined using strips of polymer 4 x 0.50 x 0.01 inches. Five samples were used for each determination. Tensile tests were done using a tensile tester with jaws set 2 inches apart and the sample pulled at the rate of 2 inches/minute.

EXAMPLE 8

Copolymerization of 1,1,1-trifluoro-2 - (trifluoromethyl)-4-methyl-4-penten-2-ol and methyl methacrylate using azobis(diisobutyronitrile) as initiator A mixture of 30 g. of freshly distilled methyl methacrylate, 10 g. of the alcohol of example (a), and 0.05 g. of azobis(diisobutyronitrile) was blanketed with nitrogen and stirred magnetically as it was heated at 65° C. After about 1 hr., the viscosity had become so high that the stirrer stopped. The polymer was dissolved in benzene, precipitated by addition of petroleum ether, redissolved in acetone, and reprecipitated a second time with petroleum ether. After being dried in a vacuum oven at 110° C. for 16 hours, the weight of colorless product was 4 g. Fluorine analyses were 1.90 and 1.44%, showing 3.4% by weight of alcohol (1.6 mole percent). Films pressed at 220° C. for 2 minutes at 12,000 p.s.i. gauge pressure between aluminum foil gave colorless, clear, homogeneous, tough films with enhanced absorption in the infrared at 2.8, 13.9, and 14.3μ. No appreciable change in hydroxyl-to-fluorine ratio occurred on repressing at 220° C., which indicates the stability of the perfluoroisopropanol group in the presence of the methyl ester groups attached to other carbon atoms along the chain.

Other preparations using the comonomer system of Examples 6–8 gave copolymers containing higher amounts of polymerized fluoroalcohol e.g., 18% by weight (approximately 7.8% molar).

EXAMPLE 9

Copolymerization of 1,1,1-trifluoro-2 - (trifluoromethyl)-4-methoxycarbonyl-4-penten-2-ol and acrylonitrile A dispersion was made up consisting of 60 ml. of water 1 g. of the sodium salt of technical lauryl alcohol sulfate, 5 g. of the alcohol of example (d), 30 g. of acrylonitrile, 0.3 g. of technical dodecyl mercaptan, 0.4 g. of potassium persulfate, and 0.2 g. of sodium bisulfite. The dispersion was protected with a nitrogen atmosphere and heated with magnetic stirring at 40° C. for 1 hour, followed by stirring at 30° C. for 20 hours. The product was coagulated from the emulsion by addition of an alcohol-water mixture, filtered, washed several times with water, several times with alcohol, and vacuum oven-dried at 110° C. for 16 hours. A white powdery product (6 g.) resulted. Inherent viscosity of the polymer was 1.60 (0.25% solutions in dimethylformamide at 25° C.), and fluorine analysis values were 5.16% and 5.15%, corresponding to 12% by weight of alcohol (2.6 mole percent).

Pressing at 160° C. for 2 min. gave a light amber-colored, hard, stiff film with enhanced absorption in the infrared at 3.1μ, 13.8μ, and 14.3μ. Pressing at 220° C. also gave a very light amber-colored, homogeneous film with no appreciable change in absorption at 13.8μ and 14.3μ relative to the 160° C. pressings, but with considerably reduced absorption at 3.1μ. The product retained solubility in dimethylformamide, an indication that loss of hydroxyl content is the result of cyclization along the polymer chain rather than crosslinking.

EXAMPLE 10

Copolymerization of the Lactone of 5,5,5-trifluoro-4-(trifluoromethyl)-4-hydroxy-2-methylenepentanoic acid and acrylonitrile Polymerization was carried out as in the previous example except that the lactone of example (e) was used rather than the corresponding open-chain compound of example (d). The final weight of dried product was 13 g. Fluorine analyses were 7.29% and 7.20%, or 15% by weight of the lactone (4 mole percent). The inherent viscosity (0.25% solutions in dimethylformamide at 25° C.) was 1.62.

Pressing of the polymer at 160° C. or 220° C. gave films with strong infrared absorption at 14.3μ and also at 13.5μ, indicative of the presence of the C—F bond. Essentially no enhanced infrared absorption was observed at 2.9μ, which indicated negligible hydroxyl content.

EXAMPLE 11

Copolymerization of 1,1,1-trifluoro-2-(trifluoromethyl)-4-penten-2-ol and acrylonitrile Polymerization was carried out as in Example 9 but with substitution of 1,1,1-trifluoro-2-(trifluoromethyl)-4-penten-2-ol for the alcohol of that example. This alcohol is the adduct of propylene and hexafluoroacetone and can be prepared by the procedure of example (a) by substituting propylene for isobutylene. The formula of the adduct is

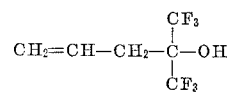

Polymerization proceeded more rapidly than in the previous examples, and was completed within 5 hours. After precipitation, purification, and vacuum oven-drying, 21 g. of powdered, dry, white product were obtained. Fluorine analyses were 1.72% and 1.74%, or 3.2% by weight of alcohol (0.84 mole percent) in the polymer. The inherent viscosity (0.25% solutions in dimethylformamide at 25° C.) was 2.14. Infrared spectra on pressings at 160° C. showed enhanced absorption at 3.0μ (the OH band), and a single new peak at 13.9μ (the C—F band).

EXAMPLE 12

Copolymerization of 1-allyl-2,2,3,3,4,4-hexafluorocyclobutanol and acrylonitrile Polymerization was carried out as in Example 9 except for substitution of the propylene-perfluorocyclobutanone adduct (B.P. 112° C. at 750 mm., $n_D^{28}$ 1.3530) for the adduct or alcohol used there. Polymerization started after 15 minutes at room temperature. After 20 hours, 25 g. of white, powdered product were isolated. Fluorine analyses were 2.96% and 2.91%, or 5.7% by weight of alcohol (1.4 mole percent). The inherent viscosity (0.25% solutions in dimethylformamide at 25° C.) was 1.76. Films were readily obtained after pressing at 160° C. The infrared spectrum of such films showed enhanced absorption at 3.0μ (OH group) and also enhanced broad absorption at 12.3–13.1μ.

1-allyl-2,2,3,3,4,4-hexafluorocyclobutanol is the adduct of propylene and perfluorocyclobutanone and has the formula

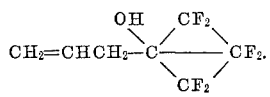

It is described by England, J. Am. Chem. Soc. 83, 2205 (1961). Other perfluorocyclobutanone/olefin adducts are shown in England U.S. Patent No. 3,140,298.

EXAMPLE 13

Copolymerization of 1,1,1-trifluoro-2-(trifluoromethyl)-4-neopentyl-4-penten-2-ol and acrylonitrile A polymerization was run as in Example 1 but with the substitution of the alcohol of example (b) for that of example (a). A white product (12 g.) was obtained, inherent viscosity (0.25% solution in dimethylformamide at 25° C.) 1.96, fluorine analyses 0.75% and 0.82%, or 2% by weight of alcohol (0.37 mole percent). Pressing at 180° C. gave an almost colorless film with a new band in the infrared at 13.9μ and enhancement of absorption at 2.95μ.

EXAMPLE 14

Copolymerization of 1,1,1-trifluoro-2-(trifluoromethyl)-4-neopentyl-4-penten-2-ol and methyl methacrylate Distilled methyl methacrylate (30 g.), 10 g. of the alcohol of example (b), and 0.05 g. of benzoyl peroxide were mixed in a flask fitted with magnetic stirrer, nitrogen inlet, and water-cooled condenser. The solution was blanketed with nitrogen and heated at 75–80° C. for 3 hours. The viscous solution was cooled, and the polymer was precipitated by the addition of petroleum ether. The polymer was redissolved in acetone and reprecipitated with petroleum ether. It was then dried in a vacuum oven at 105° C. for 16 hours. A white, powdered product (8 g.) was obtained, the inherent viscosity (0.25% concentration in acetone at 25° C.) of which was 0.74. Clear, colorless, tough films were obtained on pressing the polymer at 220° C. for 4 minutes under a pressure of 12,000 p.s.i. gauge. Fluorine analyses of the film were 2.63% and 2.17%, corresponding to 5.9% by weight of alcohol (2.2 mole percent).

EXAMPLE 15

Copolymerization of 1,1,1-trifluoro-2-(trifluoromethyl)-4-phenyl-4-penten-2-ol and methyl methacrylate Methyl methacrylate (30 g.), 7 g. of the alcohol of example (g), and 0.05 g. of azobis(diisobutyronitrile) were heated at 70–72° C. for 8 hours under nitrogen atmosphere with stirring. Some increase in viscosity was noted. Another 0.05 g. of catalyst was added and heating was resumed for another 4 hours. The viscous solution was poured into petroleum ether, the polymer was redissolved in acetone and reprecipitated in petroleum ether. After vacuum oven-drying at 110° C. for 16 hours, 7 g. of white, fluffy solid was obtained. A clear, colorless, homogeneous self-supporting film was obtained on pressing at 160° C. The infrared showed appreciable enhancement of the 2.9μ band and a new band at 14.2μ. Analysis indicates the product to be a copolymer of methyl methacrylate and 1,1,1-trifluoro-2-(trifluoromethyl)-4-phenyl-4-penten-2-ol.

EXAMPLE 16

Copolymerization of 1,1,1-trifluoro-2-(trifluoromethyl)-4-methoxy-4-penten-2-ol and acrylonitrile A mixture of 15 g. of acrylonitrile, 5 g. of the alcohol of example (h) and 0.03 g. of azobis(diisobutyronitrile) was heated with stirring for 1 hour at 70° C. under a nitrogen atmosphere, during which period a precipitate of polymer formed. After cooling, the polymer was collected on a filter, washed several times with methanol, and dried in a vacuum oven at 110° C. for 16 hours.

There was obtained about 3 g. of white copolymer containing 2.75% of fluorine, which corresponds to 5.3% by weight (1.3 mole percent) of polymerized fluoroalcohol. This copolymer had an inherent viscosity in 0.1% dimethylformamide solution at 25° C. of 3.02, indicating a high molecular weight. The glass temperature was remarkably high, 152° C. compared to about 104° C. for 100% polyacrylonitrile.

EXAMPLE 17

Copolymerization of 1,1,1-trifluoro-2-(trifluoromethyl)-4-methoxy-4-penten-2-ol and methyl methacrylate A mixture of 30 g. of freshly distilled methyl methacrylate, 10 g. of the alcohol of example (h) and 0.05 g. of azobis(diisobutyronitrile) was heated with stirring for 2 hours at 70° C. under a nitrogen atmosphere. The resulting polymer was isolated by pouring the viscous solution, diluted with acetone, into petroleum ether with good stiring. The precipitated polymer was redissolved twice in acetone and reprecipitated twice in petroleum ether. There was obtained 6.5 g. of a white, powdery copolymer containing, by fluorine analysis, 1% by weight (0.46 mole percent) of polymerized fluoroalcohol. The inherent viscosity of the copolymer (0.25% in acetone at 25° C.) was 0.54, corresponding to a molecular weight of about 300,000. The glass temperature, as measured with a penetrometer, was about 95° C.

The copolymers of this invention have the general utilities of solid or high molecular weight polymers. As will be evident from the examples, they are particularly useful in producing self-supporting films. Fibers, also, can be readily prepared from the polymers. Manufactures, e.g., films and fibers, thus constitute a specific aspect of the invention.

Since obvious modifications and equivalents in the invention will be evident to those skilled in the chemical arts, I propose to be bound solely by the appended claims.

The embodiments of the invention in which an exclusive property or privilege is claimed are defined as follows:

1. An essentially linear, solid, film- and fiber-forming polymer consisting of a copolymer of
   (I) a fluorinated alcohol of the formula

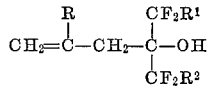

wherein R is selected from the group consisting of hydrogen, lower alkyl, lower alkoxycarbonyl, lower alkoxy, phenoxy, phenyl and cyano; and $R^1$ and $R^2$ are selected from the group consisting of monovalent fluorine, chlorine, lower perfluoroalkyl and lower ω-chloroperfluoroalkyl and divalent perfluoromethylene; and (II) and at least one ethylenic compound of the formula

wherein X is selected from the group consisting of hydrogen, fluorine, chlorine and lower alkyl; and Y is selected from the group consisting of fluorine, chlorine, lower alkoxycarbonyl, lower alkylcarbonyloxycyano and amido, (I) constituting 0.2–20 mole percent of said copolymer and (II) constituting 50–99.8 mole percent, the mole percentages of (I) and (II) in the polymer totaling 100.

2. A polymer of claim 1 comprising additionally a third component (III), said third component being a terminally unsaturated ethylenic hydrocarbon copolymerizable with (II) in the presence of a free-radical initiator and constituting up to 49 mole percent of the copolymer, the mole percentages of (I), (II) and (III), in the polymer totaling 100.

3. A polymer of claim 1 in which (II) is acrylonitrile.

4. A polymer of claim 1 in which (II) is methyl methacrylate.

5. A polymer of claim 1 consisting of a copolymer of 1,1,1-trifluoro-2-(trifluoromethyl)-4-methyl-4-penten-2-ol and acrylonitrile.

6. A polymer of claim 1 consisting of a terpolymer of 1,1,1-trifluoro-2-(trifluoromethyl)-4-methyl-4-penten-2-ol, acrylonitrile and isobutylene.

7. A polymer of claim 1 consisting of a copolymer of 1,1,1-trifluoro-2-(trifluoromethyl)-4-methyl-4-penten-2-ol and methyl methacrylate.

8. A polymer of claim 1 consisting of a copolymer of 1,1,1-trifluoro-2-(trifluoromethyl)-4-methoxycarbonyl-4-penten-2-ol and acrylonitrile.

9. A polymer of claim 1 consisting of a copolymer of 1,1,1-trifluoro-2-(trifluoromethyl)-4-penten-2-ol and acrylonitrile.

10. A polymer of claim 1 consisting of a copolymer of 1,1,1-trifluoro-2-(trifluoromethyl)-4-penten-2-ol and acrylonitrile.

11. A polymer of claim 1 consisting of a copolymer of 1,1,1-trifluoro-2-(trifluoromethyl)-4-neopentyl-4-penten-2-ol and acrylonitrile.

12. A polymer of claim 1 consisting of a copolymer of 1,1,1-trifluoro-2-(trifluoromethyl)-4-neopentyl-4-penten-2-ol and methyl methacrylate.

13. A polymer of claim 1 consisting of a copolymer of 1,1,1-trifluoro-2-(trifluoromethyl)-4-phenyl-4-penten-2-ol and methyl methacrylate.

14. A polymer of claim 1 consisting of a copolymer of 1,1,1-trifluoro-2-(trifluoromethyl)-4-methoxy-4-penten-2-ol and acrylonitrile.

15. A polymer of claim 1 consisting of a copolymer of 1,1,1-trifluoro-2-(trifluoromethyl)-4-methoxy-4-penten-2-ol and methyl methacrylate.

16. A film formed from a polymer of claim 1.

17. A fiber formed from a polymer of claim 1.

18. An essentially linear, solid, film- and fiber-forming copolymer of (I) the lactone of 5,5,5-trifluoro-4-(trifluoromethyl)-4-hydroxy-2-methylenepentanoic acid and (II) acrylonitrile, (I) constituting 0.2–20 mole percent of said copolymer and (II) constituting 50–99.8 mole percent, the mole percentages of (I) and (II) in the copolymer totaling 100.

References Cited

UNITED STATES PATENTS

| 2,490,753 | 12/1949 | Hill et al. | 260—653 |
| 3,058,960 | 10/1962 | Stewart | 260—87.5 |

FOREIGN PATENTS

| 964,755 | 7/1964 | England. |
| 625,613 | 6/1963 | Belgium. |

JOSEPH L. SCHOFER, Primary Examiner.

R. S. BENJAMIN, Assistant Examiner.

U.S. Cl. X.R.

260—80.6, 80.73, 80.75, 80.76, 80.77, 80.81, 85.5, 86.1, 86.3, 87.1, 87.5, 87.7, 88.1, 633, 900

UNITED STATES PATENT OFFICE
CERTIFICATE OF CORRECTION

Patent No. 3,444,148　　　　Dated May 13, 1969

Inventor(s) Robert L. Adelman

It is certified that error appears in the above-identified patent and that said Letters Patent are hereby corrected as shown below:

Col. 1, line 21, "Manufacturers," should be -- Manufactures, --;

Col. 3, line 14, "1-chloro-2(chlorodifluoromethyl)1,1-difluoro-4 should be -- 1-chloro-2-(chlorodifluoromethyl)-1,1-difluoro-4- -

Col. 9, line 36, "methyl)-4-methyl)." should be -- methyl)-4-methyl-4-penten-2-ol. --;

Col. 13, line 23, the bond between "C" and "$CF_2$" should be deleted; and

Col. 15, line 41, Claim 10, the second line of the claim should read: -- 1-allyl-2,2,3,3,4,4-hexafluorocyclobutanol and acry- --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents